US009447835B2

(12) United States Patent
Kim (10) Patent No.: US 9,447,835 B2
(45) Date of Patent: Sep. 20, 2016

(54) DAMPING FORCE VARIABLE VALVE ASSEMBLY AND DAMPING FORCE VARIABLE SHOCK ABSORBER HAVING THE SAME

(71) Applicant: MANDO CORPORATION, Pyeongtaek-si, Gyeonggi-do (KR)

(72) Inventor: Eun Joong Kim, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/220,815

(22) Filed: Mar. 20, 2014

(65) Prior Publication Data

US 2014/0284156 A1    Sep. 25, 2014

(30) Foreign Application Priority Data

Mar. 22, 2013   (KR) .................. 10-2013-0030691

(51) Int. Cl.
*F16F 9/00* (2006.01)
*F16F 9/512* (2006.01)

(52) U.S. Cl.
CPC ........ *F16F 9/512* (2013.01); *Y10T 137/87096* (2015.04)

(58) Field of Classification Search
CPC ......... F16F 9/34; F16F 2222/06; F16F 9/465
USPC ............................. 188/314, 322.13
See application file for complete search history.

(56) References Cited

U.S. PATENT DOCUMENTS 5,085,299 A * 2/1992 Spiess et al. ............. 188/266.5
5,413,196 A * 5/1995 Forster ...................... 188/266.6
5,850,896 A * 12/1998 Tanaka ...................... 188/266.2
5,960,915 A * 10/1999 Nezu et al. ................ 188/266.6
6,079,526 A * 6/2000 Nezu et al. ................ 188/266.6

(Continued)

FOREIGN PATENT DOCUMENTS

JP    57073441    5/1982
JP    10274274 A  10/1998

(Continued)

OTHER PUBLICATIONS

Korean Office Action for KR application No. 10-2013-0030691, issued on Apr. 14, 2014.

(Continued)

*Primary Examiner* — Robert A Siconolfi
*Assistant Examiner* — Mahbubur Rashid
(74) *Attorney, Agent, or Firm* — Hauptman Ham, LLP (57) ABSTRACT

Provided are a damping force variable valve assembly with a low-speed control valve capable of controlling an ultra-low flow rate and a low flow rate when a damping force variable valve operates in a soft mode, and a damping force variable shock absorber including the damping force variable valve assembly. The damping force variable valve assembly, which is installed in a damping force variable shock absorber for adjustment of a damping force of the shock absorber, includes: a solenoid; a spool which is movable by the magnetic force of the solenoid; a spool guide which surrounds the spool; a main valve which is installed in a main passage formed in a valve body installed in the spool guide; a back pressure chamber which is provided in the rear of the main valve; a chamber forming body which forms the back pressure chamber.

7 Claims, 5 Drawing Sheets

(56) References Cited

U.S. PATENT DOCUMENTS

| | | | |
|---|---|---|---|
| 6,302,248 B1 | 10/2001 | Nakadate | |
| 6,305,512 B1* | 10/2001 | Heinz | F16F 9/46 188/266.6 |
| 2001/0035317 A1* | 11/2001 | Sakai et al. | 188/266.2 |

FOREIGN PATENT DOCUMENTS

| | | |
|---|---|---|
| JP | 11082602 A | 3/1999 |
| JP | 11094004 A | 4/1999 |
| JP | 2001041272 A | 2/2001 |
| JP | 20090319 A | 3/2009 |

OTHER PUBLICATIONS

Office Action for corresponding Japanese application dated Dec. 16, 2014.

Chinese Office Action issued on Sep. 6, 2015 in connection with the counterpart Chinese Patent Application No. 201410108397.6.

* cited by examiner

DAMPING FORCE VARIABLE VALVE ASSEMBLY AND DAMPING FORCE VARIABLE SHOCK ABSORBER HAVING THE SAME

CROSS-REFERENCE(S) TO RELATED APPLICATION

This application claims priority of Korean Patent Application No. 10-2013-0030691, filed on Mar. 22, 2013, in the Korean Intellectual Property Office, the contents of which are incorporated herein by reference in its entirety.

BACKGROUND OF THE INVENTION

1. Field of the Invention

The present invention relates to a damping force variable valve assembly installed in a damping force variable shock absorber, and more particularly, to a damping force variable valve assembly with a low-speed control valve capable of controlling an ultra-low flow rate and a low flow rate when a damping force variable valve operates in a soft mode, and a damping force variable shock absorber including the damping force variable valve assembly.

2. Description of the Related Art

Generally, a shock absorber is installed in means of transportation such as an automobile or the like, and improves a ride comfort by absorbing and damping a vibration or shock from a road surface on the drive.

Such a shock absorber includes a cylinder and a piston rod installed to be compressible and extendable within the cylinder. The cylinder and the piston rod are installed in a vehicle body, wheels, or axles.

A shock absorber, a damping force of which is set to be low, can improve a ride comfort by absorbing a vibration caused by uneven road surface on the drive. On the contrary, a shock absorber, a damping force of which is set to be high, can improve a steering stability by suppressing a change in a posture of a vehicle body. Therefore, in the conventional vehicles, different damping force characteristics are set to shock absorbers according to the purpose of use of the vehicles.

Meanwhile, a damping force variable shock absorber has recently been developed which is mounted with a damping force variable valve at one side of the shock absorber so as to appropriately adjust a damping force characteristic, and can appropriate adjust a damping force characteristic to improve a ride comfort or a steering stability according to a road surface, a drive status, and the like.

Figure 1:
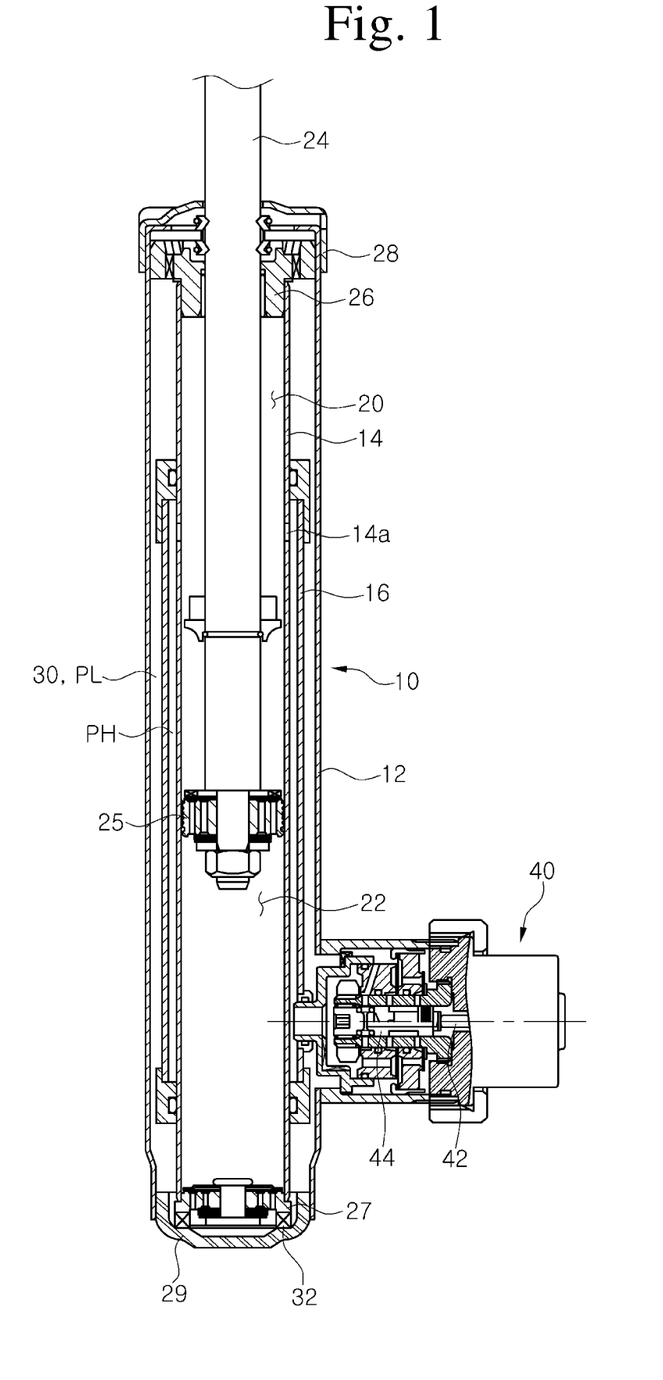
FIG. 1 is a cross-sectional view illustrating an example of a conventional damping force variable shock absorber.

FIG. 1 is a cross-sectional view illustrating an example of a conventional damping force variable shock absorber. The conventional damping force variable shock absorber 10 includes a base shell 12 and an inner tube 14 which is movably installed inside the base shell 12 and in which a piston rod 24 is movably installed in a length direction. A rod guide 26 and a body valve 27 are installed in an upper portion and a lower portion of the inner tube 14 and the base shell 12, respectively. In addition, a piston valve 25 is connected to one end of the piston rod 24 within the inner tube 14, and the piston valve 25 partitions an inner space of the inner tube 14 into a rebound chamber 20 and a compression chamber 22. A top cap 28 and a base cap 29 are installed in an upper portion and a lower portion of the base shell 12, respectively.

A reservoir chamber 30 is formed between the inner tube 14 and the base shell 12 to compensate for a change in a volume of the inner tube 14 according to a reciprocating motion of the piston rod 24. A flow of a working fluid between the reservoir chamber 30 and the compression chamber 22 is controlled by the body valve 27.

In addition, a separator tube 16 is installed inside the base shell 12. Due to the separator tube 16, the inside of the base shell 12 is partitioned into a high pressure chamber PH connected to the rebound chamber 20, and a low pressure chamber PL serving as the reservoir chamber 30.

The high pressure chamber PH is connected to the rebound chamber 20 through an inner hole 14a of the inner tube 14. On the other hand, the low pressure chamber PL is connected to the compression chamber 22 through a lower passage 32, which is formed between a body portion of the body valve 27 and the base shell 12 (or the base cap 29), and a passage formed in the body valve 27.

Meanwhile, the conventional shock absorber 10 includes a damping force variable valve assembly 40 mounted at one side of the base shell 12 so as to vary a damping force.

The damping force variable valve assembly 40 is provided with oil passages communicating with the high pressure chamber PH and the low pressure chamber PL connected to the base shell 12 and the separator tube 16, respectively. In addition, the damping force variable valve assembly 40 includes a spool 44 installed to be moved by a driving of a plunger 42. An inner passage communicating with the high pressure chamber PH and the low pressure chamber PL is varied by movement of the spool 44, and a damping force of the shock absorber is varied accordingly. The plunger 42 is configured to move in a horizontal direction, when viewed in FIG. 1, due to a magnetic force generated when an electric current flows through a solenoid.

In the conventional damping force variable valve assembly, for example, when the plunger 42 moves left, the spool 44 closes the passage to generate a high damping force (hard mode). On the contrary, when the plunger 42 moves right, the spool 44 opens the passage to generate a low damping force (soft mode).

In the technical field to which the invention pertains, many efforts have been made to provide a shock absorber having a good damping force variable characteristic by improving the performance of a damping force variable valve assembly. For example, Korean Patent Application Publication Nos. 10-2010-0023074 and 10-2010-0007187 disclose techniques of damping force variable valve assemblies recently developed for a shock absorber.

However, in spite of many efforts to improve the performance of the damping force variable valve assembly, the conventional shock absorber has a poor damping force characteristic in a section where a moving speed of a working fluid is low.

In the damping force variable valve assembly 40, when a moving speed of a working fluid is high, that is, when a flow rate is high, a resistance is determined by a sagging amount of main disk valves stacked in a valve assembly.

However, when an input (that is, shock) from a road surface is small and thus a moving speed of a working fluid is low or ultra-low, a flow rate of a working fluid flowing in a shock absorber is so extremely low that a resistance by a fixed orifice is not formed. Therefore, a damping force is not generated in a low-speed section, and a small vibration transferred from a road surface is not reduced.

SUMMARY OF THE INVENTION

The present invention has been made in an effort to solve the above problems and is directed to provide a damping force variable valve assembly having a valve structure for a low flow rate control, which is capable of generating a damping force even in an ultra-low or low flow rate section of a working fluid when a damping force variable valve operates in a soft mode, and a damping force variable shock absorber including the damping force variable valve assembly.

According to an aspect of the present invention, a damping force variable valve assembly, which is installed in a damping force variable shock absorber for adjustment of a damping force of the shock absorber, includes: a solenoid which generates a magnetic force when an electric current is applied thereto; a spool which is movable by the magnetic force of the solenoid; a spool guide which surrounds the spool to guide a movement of the spool; a valve body which is installed in the spool guide; a main valve which is installed in a main passage formed in the valve body, and generates a damping force; a back pressure chamber which is provided to have a back pressure to pressurize the main valve from the rear of the main valve; a chamber forming body which is installed outside the valve body to form the back pressure chamber; and a low-speed control valve which is installed in a low-speed passage formed in the valve body, and generates a damping force, wherein the damping force of the shock absorber is variable between a hard mode in which the back pressure of the back pressure chamber is increased and a soft mode in which the back pressure of the back pressure chamber is decreased, when an inner passage within the damping force variable valve assembly is changed by interaction of the spool and the spool guide, and the low-speed control valve generates the damping force when a flow rate of a working fluid is low in the soft mode.

The valve body may be formed by sintering, and the chamber forming body may be formed by press processing.

The spool may be provided by alternately forming large-diameter portions and small-diameter portions, and the large-diameter portions may be formed on both sides of the small-diameter portion so that a pressure of a working fluid passing through the small-diameter portion is equally applied to the large-diameter portions formed on both side of the small-diameter portion.

A stepped portion coming into contact with the low-speed control valve may be formed on an outer peripheral surface of the inlet port of the spool guide, and the low-speed control valve may be assembled by interposing between the stepped portion and the valve body fitted into the spool.

The main passage and the low-speed passage may form separate passages so that the main valve and the low-speed control valve are installed in parallel, and a working fluid supplied to the main valve may not pass through the low-speed control valve, and a working fluid supplied to the low-speed control valve may not pass through the main valve.

According to another aspect of the present invention, a damping force variable shock absorber for adjusting a damping force of the shock absorber, includes: a base shell in which a damping force variable valve assembly is attached to an outside thereof; an inner tube which is installed inside the base shell and in which a piston rod is installed movably in a length direction; a piston valve which is connected to one end of the piston rod such that an inner space of the inner tube is partitioned into a rebound chamber and a compression chamber; and a separator tube which partitions a space between the base shell and the inner tube into a low pressure chamber and a high pressure chamber. The damping force variable valve assembly may include: a spool which is movable by a magnetic force of a solenoid; a spool guide which surrounds the spool to guide a movement of the spool; a main valve which is installed to cover a main passage formed in a valve body installed in the spool guide and generates a damping force; and a low-speed control valve which is installed to cover a low-speed passage formed in the valve body and generates a damping force. The damping force of the shock absorber may be variable between a hard mode in which a back pressure of a back pressure chamber installed at the rear of the main valve is increased and a soft mode in which the back pressure of the back pressure chamber is decreased, as an inner passage within the damping force variable valve assembly is changed by interaction of the spool and the spool guide. The low-speed control valve may generate the damping force when a flow rate of a working fluid is low in the soft mode.

DETAILED DESCRIPTION OF EXEMPLARY EMBODIMENTS

Hereinafter, a damping force variable valve assembly of a damping force variable shock absorber according to exemplary embodiments of the present invention will be described in detail with reference to the accompanying drawings. In the following description given with reference to FIGS. 2 to 5, like reference numerals as those of FIG. 1 are used to refer to like elements.

According to the present invention, the damping force variable valve assembly 140 is provided with oil passages communicating with a high pressure chamber PH and a low pressure chamber PL connected to a base shell 12 and a separator tube 16, respectively. Since a structure in which the damping force variable valve assembly 140 is connected to the base shell 12 and the separator tube 16 and communicates with the high pressure chamber PH and the low pressure chamber PL is similar to that of the related art illustrated in FIG. 1, a structure in which the damping force variable valve assembly is connected to a side of the shock absorber is not illustrated in FIGS. 2 to 5.

Figure 2:
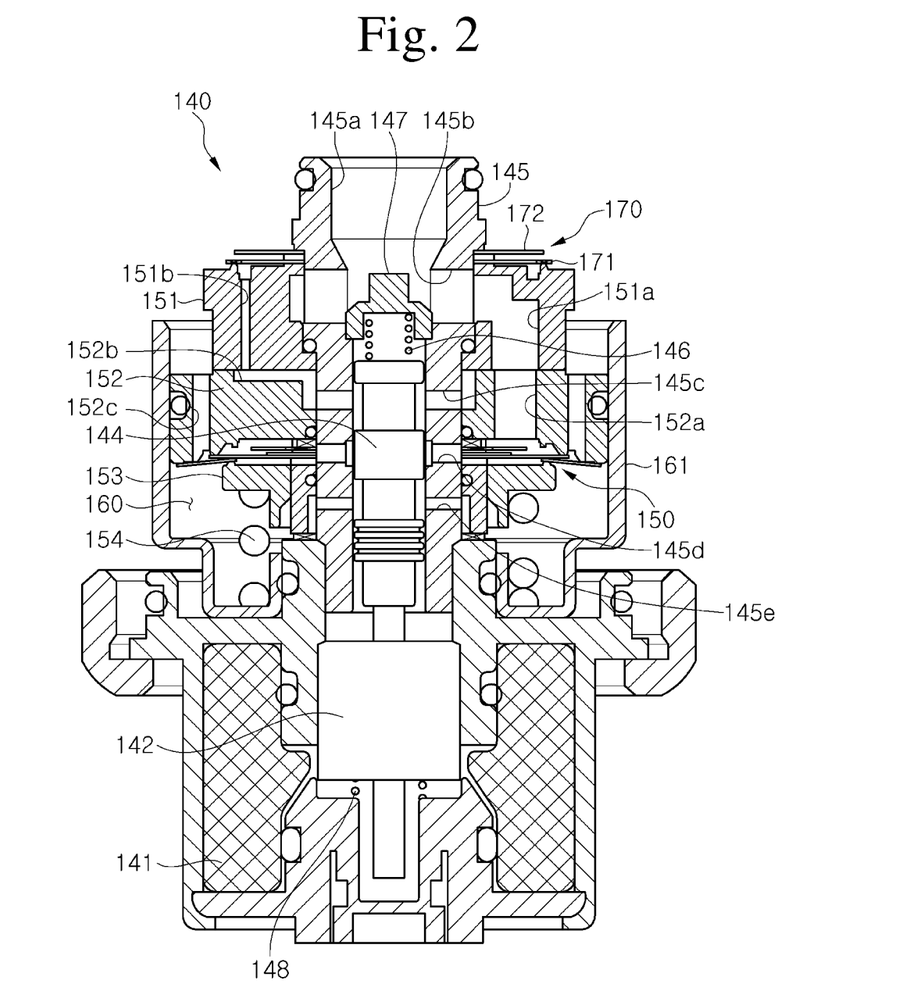
FIG. 2 is a cross-sectional view of a damping force variable valve assembly with a low-speed control valve according to the present invention.

The damping force variable valve assembly 140 includes a spool 144 installed to be moved by a driving of a plunger 142. An inner passage of the damping force variable valve assembly which communicates with the high pressure chamber PH and the low pressure chamber PL is varied by movement of the spool 144, and a damping force of the shock absorber is varied accordingly.

The damping force variable valve assembly 140 includes a main valve 150 and a back pressure chamber 160 used for varying the damping force of the shock absorber. The back pressure chamber 160 is provided to have a back pressure to pressurize the main valve 150 from the rear of the main valve 150.

The main valve 150 is installed to cover the main passage formed in a valve body from the rear of the valve body. On the other hand, the valve body is connected to the high pressure chamber PH of the above-described shock absorber through a spool guide 145 installed inside. The valve body is formed by sintering, but is not necessarily formed by a single sintered body. In the present embodiment, the valve body is provided with a first body 151 and a second body 152 formed by sintering. In addition, passages for performing various functions are formed in the first body 151 and the second body 152 constituting the valve body.

The spool guide 145 includes an inlet port 145a, one or more first inlet passages 145b, and first to third passages 145c, 145d and 145e. The first inlet port 145a is formed along a length direction such that a working fluid is introduced from the high pressure chamber PH. The one or more first inlet passages 145b are formed along a width direction to communicate with the inlet port 145a. The first to third passages 145c, 145d and 145e are formed to block or permit the flow of the working fluid by interaction with the spool 144 as described below.

The first body 151 includes a second inlet passage 151a formed to communicate with the first inlet passage 145b of the spool guide 145, and the second body 152 includes a third inlet passage 152a formed to communicate with the second inlet passage 151a of the first body 151.

The inlet port 145a, the first inlet passage 145b, the second inlet passage 151a, and the third inlet passage 152a form the main passage such that the working fluid from the high pressure chamber PH can flow toward the main valve 150.

On the other hand, in order to form the passage of the working fluid flowing toward a low-speed control valve 170 in a low-speed section, a first low-speed passage 152b is formed in the second body 152, and a second low-speed passage 151b is formed in the first body 151.

In addition, in order to form the passage of the working fluid moving toward the low pressure chamber PL through the main valve 150 in a medium/high-speed section, a medium/high-speed passage 152c is formed in the second body 152.

The back pressure chamber 160 is provided such that the pressure thereof is varied according to a driving of a solenoid 141 (that is, movement of the spool 144 due to the driving of the solenoid 141). A change in the pressure inside the back pressure chamber 160, that is, a change in the back pressure to the main valve 150, causes the main valve 150 to vary a force against the fluid passing through the main passage, thereby providing a varied damping force to the shock absorber.

According to the present invention, a chamber forming body 161 for forming the back pressure chamber 160 may be formed by press processing. Since the chamber forming body 161 is formed as a pressed product, it is possible to reduce a total weight of the damping force variable valve assembly, reduce manufacturing cost and time of the valve body formed by sintering, and reduce time and effort necessary for manufacturing.

A main retainer 153 and a main spring 154 are disposed in the back pressure chamber 160 so as to pressurize disks of the main valve 150 toward the valve body, that is, the second body 152.

The damping force variable valve assembly 140 includes a plunger 142 of which a moving distance is varied according to an amount of electric current applied to the solenoid 141. On the other hand, the damping force variable valve assembly 140 includes the spool 144 that moves along a straight line while interlocking with the plunger 142 in a state of being disposed on the same axis as the plunger 142. The spool 144 moves along the spool guide 145. One end of the spool 144 comes into contact with the plunger 142, and the other end of the spool 144 is elastically supported by a spool compression spring 146. The spool compression spring 146 is supported by a plug 147 connected to the spool guide 145. Therefore, the spool 144 moves forward by a pressurization of the plunger 142 and moves backward by a restoring force of the spool compression spring 146.

Figure 3:
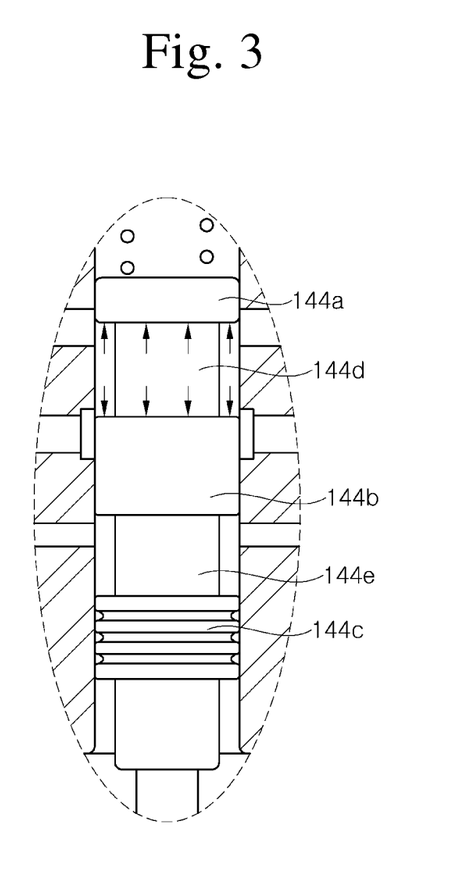
FIG. 3 is a partial enlarged cross-sectional view illustrating a spool of a damping force variable valve assembly with a low-speed control valve according to the present invention.

Referring to FIG. 3, the spool 144 is provided by alternately forming large-diameter portions and small-diameter portions. That is, when viewed from above the drawing, a first large-diameter portion 144a, a first small-diameter portion 144d, a second large-diameter portion 144b, a second small-diameter portion 144e, and a third large-diameter portion 144c are sequentially formed. As the spool 144 is moved by the solenoid 141, the first small-diameter portion 144d may communicate the first passage 145c and the second passage 145d formed in the spool guide 145, and the second small-diameter portion 144e may communicate the third passage 145e and the second passage 145d formed in the spool guide 145.

According to the present invention, since the large-diameter portions are formed on both sides of the small-diameter portion, the pressure of the fluid is equally applied to both the large-diameter portions, and therefore, the position of the spool is not deviated by the pressure of the fluid.

That is, as indicated by an arrow of FIG. 3, for example, in a case where the first large-diameter portion 144a is present, the pressure of the fluid is applied to only the top surface of the second large-diameter portion 144b when the spool 144 moves and the first small-diameter portion 144d communicates the first passage 145c and the second passage 145d of the spool guide 145. Therefore, when viewing the spool 144 in the drawing, a downward force is applied to the spool 144.

However, according to the present invention, since the first large-diameter portion 144a is present, the pressure of the fluid is applied to both the bottom surface of the first large-diameter portion 144a and the top surface of the second large-diameter portion 144b when the spool 144 moves and the first small-diameter portion 144d communicates the first passage 145c and the second passage 145d of the spool guide 145. Therefore, a force for moving the spool 144 in one direction is not applied.

On the other hand, one end of the plunger 142 comes into contact with the spool 144, and the other end of the plunger 142 is elastically supported by the spool compression spring 146.

As the plunger 142 and the spool 144 are moved by the driving of the solenoid, a variable orifice is opened/closed or a passage area is adjusted by the interaction of the spool 144 and the spool guide 145. Therefore, the opening/closing and/or the opening degree of a back pressure adjustment passage connected from the upstream side to the back pressure chamber 160 are/is controlled.

The present invention may be configured to generate a damping force even in a case where the moving speed of the working fluid is low (or ultra-low) because a low-speed control valve 170 is installed in parallel to the main valve 150. The low-speed control valve 170 may include a low-speed disk-S 171 which is mounted on a low-speed control valve mounting surface of the valve body and in which a slit is formed, and a low-speed disk 172 which can control an opening pressure or opening degree of the low-speed disk-S 171. Although one low-speed disk-S 171 and one low-speed disk 172 are illustrated in the drawing, the number thereof can be changed when necessary upon their designs.

According to the present invention, when assembling the damping force variable valve assembly, a stepped portion is formed on an outer peripheral surface of an end portion of the inlet port 145a of the spool guide 145, and the low-speed control valve 170 is fitted to come into contact with the stepped portion. Then, the first body 151, the second body 152, and the main valve 150 are fitted. In this manner, the damping force variable valve assembly may be formed. Therefore, according to the present invention, it is unnecessary to use a nut and it is possible to prevent a change in the damping force of the low-speed valve according to a pressure caused by connection through the nut, as compared with the conventional assembling method in which the low-speed control valve 170 is installed in the valve body (that is, the first body 151) and is fastened by a nut or the like.

Hereinafter, an operation state of the damping force variable valve assembly in a soft mode according to the present invention will be described in detail with reference to FIGS. 4 and 5.

Figure 4:
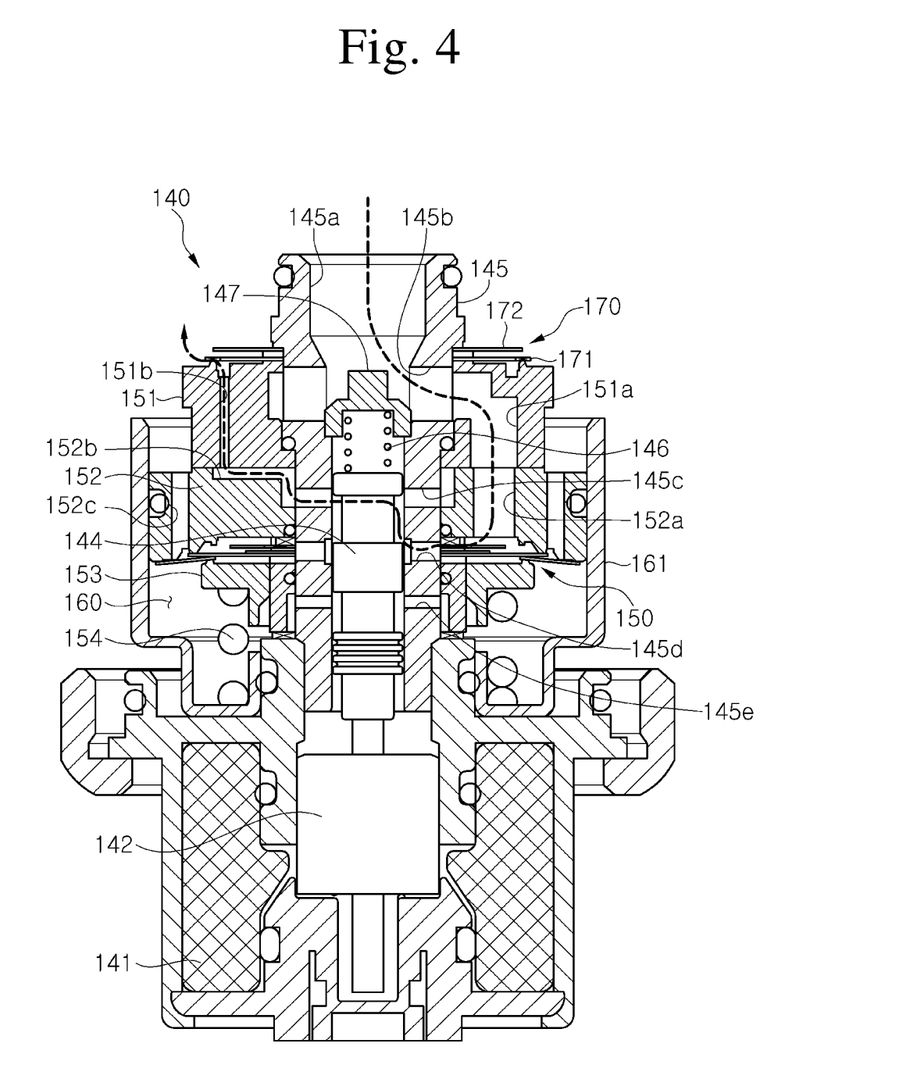
FIG. 4 is a view for explaining an operation state of the damping force variable valve assembly according to the present invention, when a flow rate of a working fluid is low in a soft mode.
Figure 5:
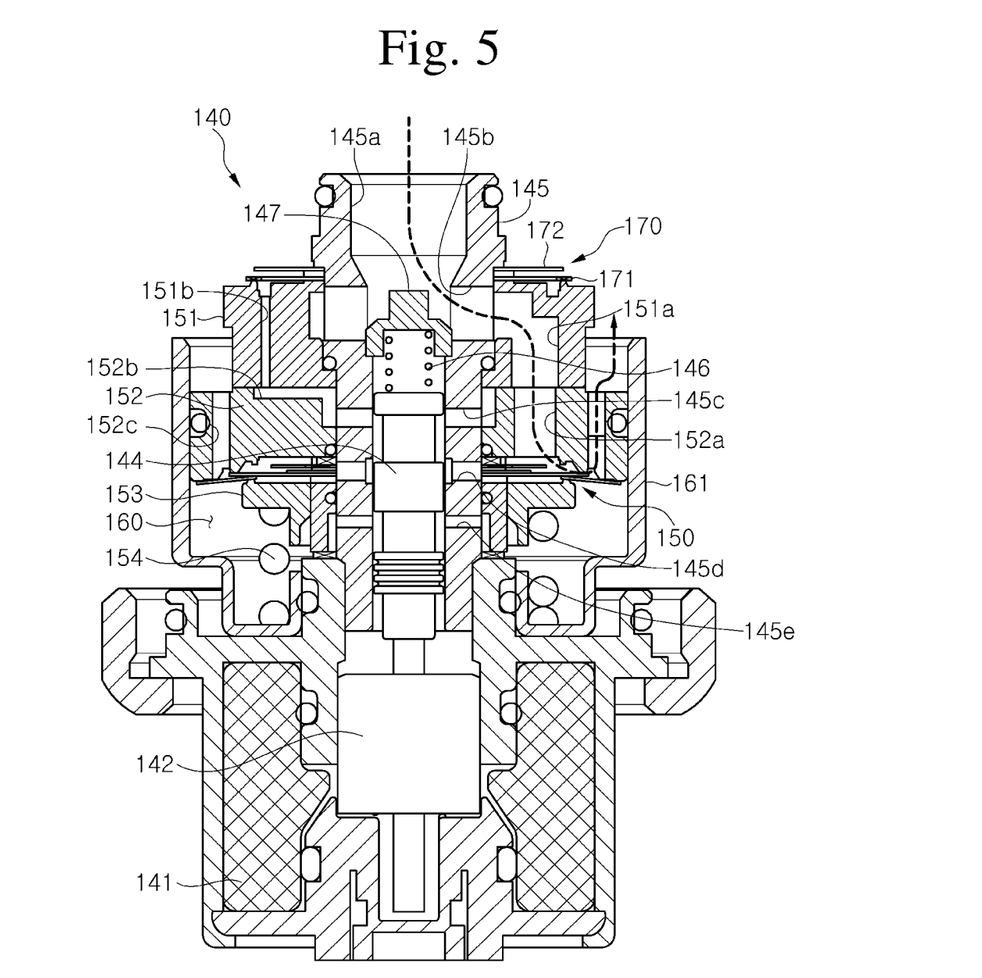
FIG. 5 is a view for explaining an operation state of the damping force variable valve assembly according to the present invention, when a flow rate of a working fluid is medium or high in a soft mode.

FIG. 4 illustrates an operation state when a flow rate of a working fluid is low (or ultra-low), and FIG. 5 illustrates an operation state when a flow rate of a working fluid is medium or high. As illustrated in FIGS. 4 and 5, when the spool 144 is moved toward an opposite side of the inlet port 145a by the operation of the solenoid 141, the first passage 145c and the second passage 145d of the spool guide 145 communicate with each other. The working fluid is not supplied toward the back pressure chamber 160. Therefore, the operation state becomes a soft mode state in which the damping force of the main valve is relatively lowered.

As illustrated in FIG. 4, when the flow rate of the working fluid in the soft mode is low, the working fluid passing through the main passage, that is, the inlet port 145a, the first inlet passage 145b, the second inlet passage 151a, and the third inlet passage 152a flows toward the second passage 145d of the spool guide 145 through the slit formed on the inner peripheral side of the disks included in the main valve 150.

Then, the working fluid passing through the second passage 145d flows toward the first passage 145c through a space between the spool guide 145 and the first small-diameter portion 144d of the spool.

Then, the working fluid passing through the first passage 145c flows toward the first low-speed passage 152b and the second low-speed passage 151b, and a damping force is generated in a low flow rate section by the low-speed control valve 170. As described above, according to the present invention, the damping force can be generated in a low-speed section, and a small vibration from a road surface can be effectively reduced to improve a ride comfort of a vehicle.

In addition, as illustrated in FIG. 5, when the flow rate of the working fluid in the soft mode is medium or high, the working fluid passing through the main passage, that is, the inlet port 145a, the first inlet passage 145b, the second inlet passage 151a, and the third inlet passage 152a deforms and pushes the disks included in the main valve 150, pass through the opened main valve 150, and then flow toward the medium/high-speed passage 152c. The working fluid moving toward the medium/high-speed passage 152c immediately flows into the reservoir chamber 30 (that is, the low pressure chamber PL) within the shock absorber.

In the structure in which the low-speed control valve is connected in series to the main valve and the working fluid passes through the low-speed control valve and is then supplied to the main valve, the effect resulting from the low-speed control valve, that is, the effect that the damping force is generated even in the section where the moving speed of the working fluid is low, and the ride comfort can be improved during a fine vibration. However, the damping force characteristic of the main valve may be affected by the low-speed control valve. That is, since the working fluid needs to pass through the low-speed control valve even in the medium/high-speed section, the damping force characteristic of the main valve may be distorted.

However, in the structure of the present invention in which the low-speed control valve 170 is connected in parallel to the main valve 150, it is possible to obtain the effect resulting from the low-speed control valve 170, that is, the effect that improves fine vibration performance and achieve a rounded ride comfort by ensuring the degree of freedom of tuning in the low-speed section. In addition, since the damping force characteristic of the main valve 150 is not affected by the low-speed control valve 170, the damping force characteristic of the main valve 150 is distorted. Consequently, the damping force non-interlocking is possible in the low-speed section and the medium/high-speed section, and the valve performance can be improved by ensuring the degree of freedom of tuning.

According to the structure of the present invention, the damping force scattering phenomenon can be improved because the passage of the working fluid flowing to the main valve 150, that is, the main passage, is separated from the passage of the working fluid flowing to the low-speed control valve 170, that is, the low-speed passage (first and second low-speed passages 152b and 151b).

In other words, the main passage and the low-speed passage form separate passages such that the main valve 150 and the low-speed control valve 170 can be installed in parallel. Therefore, according to the present invention, the working fluid supplied to the main valve 150 can be supplied to the main valve 150 without passing through the low-speed control valve 170. In addition, the working fluid supplied to the low-speed control valve 170 can be supplied to the low-speed control valve 170 without passing through the main valve 150.

As described above, the present invention can provide the damping force variable valve assembly having the valve structure for the low flow rate control, and the damping force variable shock absorber including the damping force variable valve assembly.

Therefore, the damping force variable valve assembly according to the present invention can improve a ride comfort of a vehicle by improve a damping force characteristic in a low-speed section (also including an ultra-low-speed section) to thereby effectively reduce a small frequent vibration from a road surface.

In addition, according to the present invention, since the low-speed control valve is installed not in series but in parallel to the solenoid main valve, the damping force of the medium/high-speed section obtained by the solenoid main valve is not affected by the installation of the low-speed control valve.

While the embodiments of the present invention have been described with reference to the specific embodiments, it will be apparent to those skilled in the art that various changes and modifications may be made without departing from the spirit and scope of the invention as defined in the following claims.

What is claimed is:

1. A damping force variable shock absorber for adjusting a damping force of the shock absorber, the shock absorber comprising:
    a base shell in which a damping force variable valve assembly is attached to an outside of the base shell;
    an inner tube which is installed inside the base shell and in which a piston rod is installed movably in a length direction;
    a piston valve which is connected to one end of the piston rod such that an inner space of the inner tube is partitioned into a rebound chamber and a compression chamber; and
    a separator tube which partitions a space between the base shell and the inner tube into a low pressure chamber and a high pressure chamber,
    wherein the damping force variable valve assembly comprises:
        a solenoid which generates a magnetic force when an electric current is applied thereto;
        a spool which is movable by the magnetic force of the solenoid;
        a spool guide which surrounds the spool to guide a movement of the spool;
        a valve body which is installed in the spool guide;
        a main valve which is installed in a main passage formed in the valve body, and generates a damping force;
        a back pressure chamber which is provided to have a back pressure to pressurize the main valve from the rear of the main valve;
        a chamber forming body which is installed outside the valve body to form the back pressure chamber; and
        a low-speed control valve which is installed in a low-speed passage formed in the valve body, and generates a damping force,
    wherein the damping force of the shock absorber is variable between a hard mode in which the back pressure of the back pressure chamber is increased and a soft mode in which the back pressure of the back pressure chamber is decreased, when an inner passage within the damping force variable valve assembly is changed by interaction of the spool and the spool guide,
    wherein the main passage and the low-speed passage form separate passages so that the main valve and the low-speed control valve are installed in parallel,
    wherein in the soft mode, a working fluid supplied to the main valve does not pass through the low-speed control valve, and a working fluid supplied to the low-speed control valve does not pass through the main valve, and the low-speed control valve generates the damping force when a flow rate of a working fluid is low in the soft mode,
    wherein the working fluid flows, from the high pressure chamber which is communicated with the rebound chamber and formed between the inner tube and the separator tube, through the main passage and the main valve, or through the low-speed passage and the low-speed control valve, directly to the low pressure chamber which is formed between the base shell and the separator tube, based on the flow rate of the working fluid in the soft mode,
    wherein the spool comprises alternating large-diameter portions and small-diameter portions,
    wherein the spool guide includes an inlet port, a first inlet passage, a first passage and a second passage,
    wherein the valve body includes a second inlet passage and third inlet passage,
    wherein in the soft mode, when the flow rate of the working fluid is low,
        the working fluid passing through the main passage including the inlet port, the first inlet passage, the second inlet passage, and the third inlet passage flows toward the second passage through a slit formed on an inner peripheral side of disks included in the main valve,
        the working fluid passing through the second passage flows toward the first passage through a space between the spool guide and a first small-diameter portion of the spool,
        the working fluid passing through the first passage flows toward the low-speed passage,
        the damping force is generated in a low flow rate section by the low-speed control valve, and
        the working fluid passing through the low-speed passage flows toward the low pressure chamber.

2. The shock absorber according to claim 1, wherein the valve body is formed by sintering, and the chamber forming body is formed by press processing.

3. The shock absorber according to claim 1, wherein the large-diameter portions are formed on both sides of each small-diameter portion so that a pressure of a working fluid passing through the small-diameter portion is equally applied to the large-diameter portions formed on both sides of the each small-diameter portion.

4. The shock absorber according to claim 1, wherein a stepped portion coming into contact with the low-speed control valve is formed on an outer peripheral surface of the inlet port of the spool guide, and the low-speed control valve is assembled by interposing between the stepped portion and the valve body fitted into the spool.

5. A damping force variable shock absorber for adjusting a damping force of the shock absorber, the damping force variable shock absorber comprising:
    a base shell in which a damping force variable valve assembly is attached to an outside of the base shell;
    an inner tube which is installed inside the base shell and in which a piston rod is installed movably in a length direction;
    a piston valve which is connected to one end of the piston rod such that an inner space of the inner tube is partitioned into a rebound chamber and a compression chamber; and
    a separator tube which partitions a space between the base shell and the inner tube into a low pressure chamber and a high pressure chamber,
    wherein the damping force variable valve assembly comprises:
        a spool which is movable by a magnetic force of a solenoid;
        a spool guide which surrounds the spool to guide a movement of the spool;
        a main valve which is installed to cover a main passage formed in a valve body installed in the spool guide and generates a damping force; and
        a low-speed control valve which is installed to cover a low-speed passage formed in the valve body and generates a damping force,
    wherein the damping force of the shock absorber is variable between a hard mode in which a back pressure of a back pressure chamber installed at the rear of the main valve is increased and a soft mode in which the back pressure of the back pressure chamber is decreased, as an inner passage within the damping force variable valve assembly is changed by interaction of the spool and the spool guide, wherein the main passage and the low-speed passage form separate passages so that the main valve and the low-speed control valve are installed in parallel, wherein in the soft mode, a working fluid supplied to the main valve does not pass through the low-speed control valve, and a working fluid supplied to the low-speed control valve does not pass through the main valve, and the low-speed control valve generates the damping force when a flow rate of a working fluid is low in the soft mode, wherein the working fluid flows, from the high pressure chamber which is communicated with the rebound chamber and formed between the inner tube and the separator tube, through the main passage and the main valve, or through the low-speed passage and the low-speed control valve, directly to the low pressure chamber which is formed between the base shell and the separator tube, based on the flow rate of the working fluid in the soft mode, wherein the spool comprises alternating large-diameter portions and small-diameter portions, wherein the spool guide includes an inlet port, a first inlet passage, a first passage and a second passage, wherein the valve body includes a second inlet passage and third inlet passage, wherein in the soft mode, when the flow rate of the working fluid is low, the working fluid passing through the main passage including the inlet port, the first inlet passage, the second inlet passage, and the third inlet passage flows toward the second passage through a slit formed on an inner peripheral side of disks included in the main valve, the working fluid passing through the second passage flows toward the first passage through a space between the spool guide and a first small-diameter portion of the spool, the working fluid passing through the first passage flows toward the low-speed passage, the damping force is generated in a low flow rate section by the low-speed control valve, and the working fluid passing through the low-speed passage flows toward the low pressure chamber.

6. The shock absorber according to claim 1, wherein the spool is free from including a passage traversing an extension direction of the main passage in the at least one small diameter portion.

7. The damping force variable shock absorber according to claim 5, wherein the spool is free from including a passage traversing an extension direction of the main passage in the at least one small diameter portion.

* * * * *